United States Patent
Paolilli et al.

(10) Patent No.: US 9,617,059 B2
(45) Date of Patent: *Apr. 11, 2017

(54) POLYESTER FILM WITH CITRIC ACID-MODIFIED POLYVINYL AMINE

(71) Applicants: Tracy A. Paolilli, East Greenwich, RI (US); Joshua Cloutier, Exeter, RI (US); John J. Fitch, Middletown, RI (US)

(72) Inventors: Tracy A. Paolilli, East Greenwich, RI (US); Joshua Cloutier, Exeter, RI (US); John J. Fitch, Middletown, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,619

(22) Filed: Nov. 15, 2016

(65) Prior Publication Data

US 2017/0057727 A1 Mar. 2, 2017

Related U.S. Application Data

(62) Division of application No. 14/529,750, filed on Oct. 31, 2014.

(51) Int. Cl.
| | |
|---|---|
| *B65D 81/24* | (2006.01) |
| *B32B 27/36* | (2006.01) |
| *B32B 27/30* | (2006.01) |
| *B32B 37/04* | (2006.01) |
| *C08J 7/04* | (2006.01) |

(52) U.S. Cl.
CPC ............ *B65D 81/245* (2013.01); *B32B 27/30* (2013.01); *B32B 27/36* (2013.01); *B32B 37/04* (2013.01); *C08J 7/047* (2013.01); *B32B 2439/70* (2013.01); *C08J 2367/00* (2013.01); *C08J 2429/04* (2013.01); *C08J 2439/02* (2013.01)

(58) Field of Classification Search
CPC ....... B65D 81/245; B29C 55/143; C08F 8/10; C08F 26/02
See application file for complete search history.

(56) References Cited

U.S. PATENT DOCUMENTS

2013/0344264 A1* 12/2013 Chicarella .............. B32B 27/36
428/34.7

* cited by examiner

*Primary Examiner* — Kuo-Liang Peng
(74) *Attorney, Agent, or Firm* — Jeffrey C. Lew

(57) ABSTRACT

A composite barrier film has a base layer of polyester with a barrier layer modified polyvinyl amine (mPVA). The mPVA is polyvinyl alcohol/polyvinyl amine copolymer crosslinked with citric acid and an optional additional crosslinking agent such as epichlorohydrin. The barrier layer can be applied by deposition of a reactive aqueous solution onto the base layer, heating and drying to remove water and crosslink the reactants. Excellent barrier properties of the film are obtained by applying and crosslinking the barrier layer during the transverse stretching steps of a biaxial oriented polymer film continuous fabrication process. Superior barrier properties are achieved with transverse stretching by a factor of about 3-4.

18 Claims, No Drawings

POLYESTER FILM WITH CITRIC ACID-MODIFIED POLYVINYL AMINE

FIELD OF THE INVENTION

This invention relates to a polymeric barrier film comprising a layer of citric acid-modified polyvinyl amine. More specifically it relates to a multilayer film that has a polymeric base layer and a moisture and oxygen barrier layer of polyvinyl amine crosslinked with citric acid and which is suitable for food packaging.

BACKGROUND OF THE INVENTION

Biaxially oriented polypropylene (BOPP) and biaxially oriented polyester (BOPET) films are used for packaging, decorative, balloon and label applications and often perform multiple functions. In label uses they typically occur in a laminated structure to provide printability, and may have transparent or matte appearance, or slip properties. In packaging uses these films sometimes form a base layer in a multilayer composite to provide structural integrity for containment function. The base layer also can support the other layers that have useful properties related to packaging. For example, the composite can have organic or inorganic layers for enhanced gas and moisture barrier properties, a heat seal layer for forming a heat sealable container such as a bag, and/or a substrate layer suitable for receiving an adhesive either by coating or laminating.

Interest in an improved clear packaging film suitable for food products has been developing recently to satisfy consumers' strong desire to see the product within a package being purchased. It is frequently important for the packaging films to have good moisture vapor and oxygen gas barrier properties to maintain freshness of product, especially for sensitive, perishable goods such as food items. BOPP and BOPET film can be coated with very thin layers of metal, such as aluminum to cost effectively enhance barrier properties. However, metalized films with good barrier properties are typically not sufficiently transparent. While such film also can protect light sensitive product from photo-degradation it prevents viewing package contents. Thus there is a continuing need for clear packaging film that provides very good resistance to transmission of water vapor or oxygen gas with either no metallization or optionally ultra thin, non-hazy or non-opaque metallization. Commercial clear metalizing techniques such as aluminum oxide or silicon oxide can provide some gas barrier protection, but are known to make the film very brittle with poor resistance to flex cracking.

It is well known that polyvinyl alcohol (PVOH), ethylene vinyl alcohol copolymer (EVOH) or blends thereof can be applied to packaging films as a moisture vapor and oxygen transmission resistant layer. It is commonly used on BOPP and BOPET base layers in multilayer packaging films. Advantageously, the PVOH or EVOH layer is clear so that the packaging film can be transparent. Unfortunately, polyolefin or polyester packaging film coated with a PVOH or EVOH barrier layer has not been found to provide high quality of moisture vapor and oxygen resistance desired for products that are very sensitive or need to be stored for extended durations. In addition, high humidity conditions can cause PVOH or EVOH coatings to absorb moisture or swell which can reduce gas barrier effectiveness.

There remains need to have a clear packaging film with good physical properties for strength and film handling purposes and that also has excellent moisture vapor and oxygen transmission resistance. It is much desired to have a clear BOPP or BOPET film that has very good barrier properties. A great need exists for clear, BOPP or BOPET film that can be produced cost competitively with existing films and has oxygen transmission resistance comparable or better than PVOH or EVOH barrier coated packaging films. It is particularly desirable to have highly oxygen and moisture vapor transmission resistant film for packaging of snack foods.

SUMMARY OF THE INVENTION

An optically clear composite barrier film with a base layer having a core layer of polyolefin or polyester and a coextensive polymeric barrier layer that is very resistant to moisture vapor and oxygen transmission has been discovered. The barrier layer composition is a polymer including polyvinyl amine monomer which is crosslinked with citric acid. Preferably the polymer is polyvinyl alcohol/polyvinyl amine copolymer (PVOH/PVA). The crosslinked product of the polyvinyl amine polymer is sometimes referred to as "modified PVA polymer" or "mPVA". A crosslinking agent in addition to citric acid, such as epichlorohydrin, optionally can be included to form the mPVA material.

Polypropylene (PP) and polyethylene terephthalate (PET) films independently coated with a layer of mPVA have the uniquely beneficial ability to be stretched to extreme cross-directional extensions to form biaxially oriented polypropylene (BOPP) and biaxially oriented polyethylene terephthalate (BOPET), respectively. Moreover, the mPVA layer applied according to this invention maintains sufficient structural integrity during biaxial stretching that the composite film provides enhanced moisture vapor and oxygen barrier performance even after cross-directional stretching in the range of 300%-850% (i.e., 3×-8.5×) or more of original dimensions. Performance of the novel composite film meets and usually far exceeds oxygen transmission resistance of polymeric base layer composites coated with similar thickness of exclusively PVOH or EVOH barrier layer.

Advantageously, the novel composite barrier film can be fabricated with economical raw materials in a simple process using existing commercial unit operations with at most only minor equipment modifications. Thus the highly effective film can be made relatively inexpensively with high productivity.

This invention provides a composite barrier film comprising a base layer defining a base layer thickness, the base layer having a core layer of polyolefin or polyester, and a barrier layer coextensively adjacent in direct contact with the base layer, the barrier layer defining a barrier layer thickness and comprising modified polyvinyl amine, in which the modified polyvinyl amine is polyvinyl alcohol/polyvinyl amine copolymer crosslinked by citric acid. Optionally, the base layer can include an adhesive layer on a side of the core layer facing the barrier layer such that the adhesive layer is between the core layer and the barrier layer.

Also the film has a superior combination of optical and barrier properties. With respect to clarity, the barrier layer and optional adhesive layer have the same degree of transparency as the base layer. Respecting barrier properties, the barrier film has moisture vapor transmission rate and oxygen transmission rate at most equal to that of a composite control film that has a control base layer identical to the base layer and a control barrier layer of polyvinyl alcohol commensurate in thickness with the barrier layer.

There is also a provided a method of making a composite barrier film comprising the steps of (I) providing an aqueous solution comprising polyvinyl alcohol/polyvinyl amine copolymer and citric acid, (II) providing a base layer having a core layer comprising a polymer selected from the group consisting of polyolefin and polyester, the base layer defining a length in a first technical direction and a width in a second technical direction transverse to the first technical direction, (III) stretching the base layer in the first technical direction by a stretch factor of about 1-5 times the length, (IV) coating the aqueous solution onto a surface of the base layer, and (V) heating the base layer to a temperature of about 150° C.-185° C. for about 5 seconds-60 seconds effectively to crosslink the polyvinyl alcohol/polyvinylammine copolymer with the citric acid thereby forming the composite film having a barrier layer of modified polyvinyl amine affixed to the surface of the base layer.

The novel method further optionally includes providing an adhesion layer coextensively adjacent in direct contact with a side of the core layer and then coating the aqueous solution on the adhesion layer opposite the core layer.

Still further the novel method can include stretching the composite barrier film in the second technical direction by a stretch factor of about 3-10 times the width.

DETAILED DESCRIPTION OF THE INVENTION

Generally, the novel product is an optically clear, multilayer polymeric composite barrier film with superior oxygen transmission resistance suitable for packaging end use applications, such as snack food packaging. The composite barrier film comprises a polymeric base layer that includes a core layer of polyolefin or polyester. The film also comprises a barrier layer of modified PVOH/PVA polymer (mPVA) coextensive and adjacent in direct contact with the surface of one side of the base layer. In a preferred embodiment, the polymeric composite barrier film consists essentially of one base layer and one barrier layer.

In another preferred embodiment the base layer additionally includes an adhesive layer between the core layer and the barrier layer. The purpose of the adhesive layer is to increase adhesion between the base layer and barrier layer. The adhesive layer should not substantially detract from the optical clarity of the composite barrier film. The adhesive layer is preferably a polymeric composition having affinity for both the mPVA and the base layer polymer. The adhesive layer composition is preferably an amorphous copolyester, a primer coating or a polar polymer having polar functional groups substituted on, grafted onto or copolymerized into the polar polymer chain. Examples of suitable polar functional groups include amide group, ester group, carbonate group, acetal group, ether group, sulfide group, nitrile group, hydroxyl group, carbonyl group, carboxyl group, amino group, and sulfonic acid group. Preferred polar polymer for the adhesive layer includes at least one selected from the group consisting of polyamide, polyester, polycarbonate, polyacetal, non-crosslinked polyvinyl alcohol, non-crosslinked ethylene-vinyl alcohol copolymer, polyvinyl acetal, polyvinyl acetate, poly(meth)acrylate, polyurethane, and polyurea. Preference is given to adhesive polymer grafted, substituted or copolymerized with maleic anhydride.

By "consists essentially of" is meant that the film can include additional structural elements and composition components, usually in small proportion, that do not materially affect the novel aspects of the invention. For example, additional structural elements and components not deemed material to the invention include full or partial metal or pigment coatings for decorative purposes, organic solvents, surfactants or coalescing agents for solution processing purposes, biocides, and inorganic particles for anti-blocking purposes.

Practice of this invention has two main unusual aspects. One is the preparation of a novel liquid coating solution of PVOH/PVA and citric acid for deposition onto the base layer. The other involves the method of depositing the coating solution on the base layer to form a wet coated intermediate film and treating the intermediate film to react the PVOH/PVA with citric acid and optional additional crosslinking agent to form the mPVA/biaxially oriented polymer base layer composite film product.

Among other details to be explained more specifically below, preparing the liquid coating solution is somewhat unique in the following respects. Preferably solvent for the liquid coating solution mainly consists essentially of water. Although solute components of the solution can be charged to and dissolved in the solvent in any order including simultaneously, a step-wise procedure is greatly preferred. The step-wise procedure calls for dissolving all of the citric acid before adding and dissolving any of the PVOH/PVA polymer. Once the citric acid is completely dissolved, the PVOH/PVA polymer can be added to the solution.

As will be explained below, an optional additional crosslinking agent can be utilized in conjunction with citric acid to form the mPVA composition. When such an additional crosslinking agent is utilized, it is added to the liquid coating solution after the PVOH/PVA polymer component is added, and preferably after the PVOH/PVA polymer is dissolved. More preferably, the optional additional crosslinking agent is added to the solution very shortly before the solution is applied to the base layer.

After depositing the novel coating solution onto the base layer, enhanced barrier properties are achieved by reacting the citric acid under suitable conditions of temperature and dehydration to form a substantially dry, solid polymer layer of mPVA affixed to the base layer. It has been discovered that superior barrier properties result when the substrate base layer is stretched while heating and drying the solution. One purpose of stretching is to reduce the thickness of the composite film and thereby provide greater economy of the consumable materials. Another purpose is to orient the base layer that contributes to strengthening of the film in packaging end use applications. Serendipitously, the steps of acid-amine crosslinking (i.e., reacting to form mPVA), drying of the mPVA layer and the stretching/orienting steps can be performed by the transverse direction stretching unit operations that occur during the biaxial orientation of base polymer film. Thus the process for making the novel barrier film calls for forming for example by casting, a self-supporting base layer, uniaxially stretching the base layer, depositing the coating solution onto the uniaxially stretched base layer, and heating, drying and stretching in tenter frame equipment to thereby produce the biaxially stretched composite barrier film. It has been discovered that stretching while heating and drying the mPVA layer contributes to achieving consistently excellent barrier properties.

The barrier properties in a clear polymer packaging film achieved by practice of this invention at least equal, normally exceed and routinely far exceed those obtained with conventional composite film of polyester or polyolefin base layer coated with a conventional PVOH or EVOH barrier layer for packaging end use applications. The novel film usually has an overall thickness of about 36-100 gauge "G" (about 9-25 μm) and a barrier layer thickness equivalent to a coating density on dry basis of about 0.1-0.39 pound per ream (about 0.16-0.63 g/m$^2$), and preferably about 0.12-0.2 pound per ream (about 0.2-0.32 g/m$^2$). For these specifications, 1 ream is equal to 3,000 ft$^2$ (279 m$^2$). The permeation property of a specific migrating compound through any particular packaging film is determined largely by nature of the barrier composition. Transmission rate in use also depends upon thickness of the barrier. Conventional PVOH barrier coated film for packaging typically exhibits oxygen transmission rate (OTR) as low as about 0.4 cm$^3$/100 in$^2$/day (about 6.2 cm$^3$/m$^2$/day) and moisture vapor transmission rate (MVTR) as low as about 0.13 g/100 in$^2$/day (about 2 g/m$^2$/day). While one or the other transmission rate might be lower than these typical limits in some packaging film, rarely if ever are both OTR and MVTR below these values in a single, optically clear, conventional packaging film. Composite film according to this invention should provide OTR about 0.005-0.2 cm$^3$/100 in$^2$/day (about 0.08-3.1 cm$^3$/m$^2$/day) and MVTR about 0.05-0.13 g/100 in$^2$/day (about 0.8-2 g/m$^2$/day), Preferably, the novel composite packaging film provides OTR in the range of about 0.008-0.06 cm$^3$/100 in$^2$/day (about 0.12-0.93 cm$^3$/m$^2$/day) and MVTR about 0.07-0.12 g/100 in$^2$/day (about 1.1-1.9 g/m$^2$/day), MVTR values apply under ambient challenge conditions of 100° F. (38° C.) and 90% relative humidity. OTR values of about 0.008-1.2 cm$^3$/100 in$^2$/day (about 0.12-18.8 cm$^3$/m$^2$/day) apply under ambient challenge conditions of 73° F. (23° C.) and 0% relative humidity.

Polymeric Base Layer

Composition of the base layer can be any polymer composition that can form an optically clear, self-supporting film in the thickness range of about 5-50 μm and that is compatible with PVOH/PVA. By compatible with PVOH/PVA is meant that a dried layer of PVOH/PVA formed by evaporating substantially all water from an aqueous PVOH/PVA solution deposited on a bare flat sheet of the polymer composition does not delaminate from the substrate. Delamination is determined by a tape adhesion test (Tape Test) in which a 25.4 mm (1 inch) wide×20.3 cm (8 inch) long piece of Scotch™ Brand 810 pressure sensitive adhesive tape is adhered to a 21.6 cm×28 cm (8.5 inch×11 inch) film sample of PVOH/PVA polymer on a base layer of polymer being tested. The tape is peeled rapidly from the sample in direction perpendicular to the plane of the sample and observed for transfer of the PVOH/PVA layer to the adhesive tape. The degree of compatibility is indicated by the percentage area of PVOH/PVA layer on the sample film that transfers to the adhesive tape. Transfer of at most about 20 percent is deemed to show satisfactory compatibility between substrate and PVOH/PVA in context of this invention. Transfer should preferably be at most about 10 percent, more preferably at most about 5 percent, and most preferably at most about 2 percent of the PVOH/PVA layer.

Preference is also given to polymers that form films having mechanical properties useful for packaging applications such as good tensile strength, flexural modulus, breaking strength and the like. Preferred polymers suitable for use in this invention include polyesters, polyolefins, and polyhydroxy acids. Polyhydroxy acids, such as polylactic acid are preferred in end use applications with enhanced environmentally protective product specifications. Thus polyhydroxy acids are favored when the end use calls for improved biodegradation ability of the film or for employing environmentally sustainable or renewable raw materials.

The polyester used in this invention is a polyester mainly composed of an aromatic dicarboxylic acid, alicyclic dicarboxylic acid or aliphatic dicarboxylic acid and a diol. The aromatic dicarboxylic acids that can be used here include, for example, terephthalic acid, isophthalic acid, phthalic acid, 1,4-naphthalenedicarboxylic acid, 1,5-naphthalenedicarboxylic acid, 2,6-naphthalenedicarboxylic acid, 4,4'-diphenyldicarboxylic acid, 4,4'-diphenyletherdicarboxylic acid and 4,4'-diphenylsulfonedicarboxylic acid. Among them, terephthalic acid, phthalic acid and 2,6-napthalenedicarboxylic acid can be preferably used. As the alicyclic dicarboxylic acid, for example, cyclohexanedicarboxylic acid can be used. The aliphatic dicarboxylic acids that can be used here include, for example, adipic acid, suberic acid, sebacic acid and dodecanedionic acid. One of these acids can be used, or two or more of them can also be used in combination.

The diols that can be used here include, for example, ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, and polyalkylene glycol, 2,2'-bis (4'β-hydroxyethoxyphenyl)propane. Among them, preferable are ethylene glycol, 1,4-butanediol, 1,4-cyclohexanedimethanol and diethylene glycol. Especially preferable is ethylene glycol. One of these diols can be used, or two or more of them can also be used in combination.

The polyester may also be copolymerized with another compound such as trimellitic acid, pyromellitic acid, glycerol, pentaerythritol, 2,4-dihydroxybenzoic acid, lauryl alcohol or phenyl isocyanate, as far as the polymer is substantially linear. As the polyester of this invention, polyethylene terephthalate (PET), polyethylene-2,6-naphthalenedicarboxylate (PEN) or a copolymer thereof or a modification product thereof is especially preferable. PET is the most preferred polyester.

The polyolefin suitable for use in this invention is a polymer selected from the group consisting of isotactic polypropylene homopolymer, syndiotactic polypropylene homopolymer, metallocene catalyzed isotactic polypropylene homopolymer, metallocene catalyzed syndiotactic polypropylene, ethylene-propylene random polymer, butene-propylene random copolymer, high density polyethylene, low density polyethylene, linear low density polyethylene and combinations thereof. Crystalline homopolymer polypropylene (PP) is a preferred polyolefin.

Preference is given to crystalline polypropylenes having a specific isotactic content. Crystalline polypropylene having an isotactic content of at least about 90% as measured by C$^{13}$ nuclear magnetic resonance (NMR) analysis is preferred. Representative examples of crystalline polypropylene material suitable for this invention are Total Petrochemical 3271 and Philipps 66 CH016. These polymers also have melt index flow rates of about 0.5 to 5 g/10 min at 230°, a melting point of about 163-167° C., a crystallization temperature of about 108-126° C., a heat of fusion of about 86-110 J/g, a heat of crystallization of about 105-111 J/g, and a density of about 0.90-0.91 g/cm$^3$.

The base layer can be monolithic and consist of a single, core layer of polymer. In such case the base layer is the core layer and the barrier layer is coextensive with and in direct contact with one side of the core layer polymer of the base layer. Alternatively, the base layer can be a composite of multiple layers including the core layer and additional layers on one or both sides of the core layer. The additional layers can be produced contemporaneously with the core layer, for example by coextrusion, or separately as independent films and subsequently attached to the core layer, for example by lamination.

In a preferred embodiment the base layer has an adhesive layer on one side of the core layer. The composite barrier film is structured such that the adhesive layer is between the core layer and the barrier layer. A purpose of the adhesive layer is to increase adhesion between the base layer and barrier layer to greater extent than achieved by the mPVA composition barrier layer formed directly in contact with the core layer polymer. Another purpose is to improve wetting of the surface of the base layer by the barrier layer liquid coating solution. The adhesive layer composition should be selected to not substantially detract from the optical clarity of the composite barrier film.

The material for the adhesive layer is preferably provided as a melt processable resin that is coextruded onto a surface of the base layer. The barrier layer coating solution is then deposited onto the thus produced exposed surface adhesion layer.

To achieve enhanced wetting by the typically aqueous barrier coating solutions employed in this invention, the adhesive layer composition can include a primer that has compatible surface energy characteristics with such solutions. A representative primer is polyethylene imine. Other components for an adhesive layer composition having affinity for both the mPVA and the base layer polymer can be a polar polymer having polar functional groups substituted on, grafted onto or copolymerized into the polar polymer chain. Examples of suitable polar functional groups include amide group, ester group, carbonate group, acetal group, ether group, sulfide group, nitrile group, hydroxyl group, carbonyl group, carboxyl group, amino group, and sulfonic acid group. Preferred polar polymer for the adhesive layer includes at least one selected from the group consisting of polyamide, polyester, polycarbonate, polyacetal, non-crosslinked polyvinyl alcohol, non-crosslinked ethylene-vinyl alcohol copolymer, polyvinyl acetal, polyvinyl acetate, poly (meth)acrylate, polyurethane, and polyurea. Preference is given to polymer of amorphous copolyester or polymer grafted, substituted or copolymerized with maleic anhydride. In polyolefin-based base layer embodiments, i.e., with core layers predominantly of polyolefin, great preference is given to having an adhesive layer between the core layer and the barrier layer of a maleic anhydride-grafted polyolefin. A highly preferred adhesive layer composition for polypropylene base layers is polypropylene or propylene copolymer with grafted maleic anhydride. For example, Admer® QF500A polyolefin resin available from Mitsui Chemicals, Tokyo, Japan. The base layer can be a bi-layered composite consisting only of the core layer and adhesive layer.

In other contemplated embodiments, other layers can be present. For example an optional skin layer can be positioned adjacent to the core layer opposite the side of the barrier layer in contact with the barrier layer. The skin layer is predominantly polymeric and can contain additives, such as anti-blocking components to render the composite barrier film more easily handled by film processing equipment during and after film fabrication operations. Typically the skin layer is thinner than the core layer. Anti-blocking agents are usually present as a discrete phase of inorganic particles dispersed uniformly in the skin layer continuous phase polymer. The skin layer polymer can be different from, but typically is the same composition as the core layer polymer.

A primary end use application for this novel composite barrier film is food packaging and especially snack food packaging. The composite can also have layers desired for such packaging in addition to those previously mentioned. For example, a decorative layer can be deployed partially coextensive with the barrier film. The decorative layer can include pigmented polymer and/or inorganic material such as metal. To achieve full visibility of package contents, the composite can be free of any layer of inorganic material that might fully or partially reduce film clarity. It is also contemplated that the skin layer of the composite can have low temperature thermoplastic property to act as a sealant for purposes of facilitating package fabrication and closure after filling of the package.

In addition to a composite barrier film comprising a base layer and a barrier layer as described above, contemplated embodiments of this invention also include (i) a composite barrier film consisting of a monolithic base layer and a barrier layer adjacent the base layer, and (ii) a composite barrier layer consisting of a multilayer base layer consisting of a core layer and at least one of an adhesive layer and a skin layer, and a barrier layer adjacent the base layer.

Barrier Layer Composition

The barrier layer composition is a citric acid crosslinked polyvinyl amine. Citric acid has the formula $HOOCCH_2C(OH)(COOH)CH_2COOH$, a melting point of 153° C. and water solubility of 240 g/100 g $H_2O$ at 25° C. A suitable example of acceptable citric acid is food grade, white, solid powder, water soluble pH 2.1, CAS No. 77-92-9 anhydrous citric acid available from Duda Energy, LLC (Decatur, Ala.). Having multiple potentially reactive carboxyl functional groups per molecule, citric acid is able to cross link with the amine moiety present on the polyvinyl amine, as explained by the reactions described in greater detail below. Thus in connection with this invention, the terms "modification" and "modified polyvinyl amine" are sometimes referred to respectively herein as "crosslinked" and "crosslinked polyvinyl amine" and the like.

The polymeric component of the barrier layer crosslinked by citric acid is polyvinyl amine. Although expected to have good gas barrier properties when reacted with citric acid according to this invention, polyvinyl amine tends to become increasingly brittle and inflexible as the vinylamine content increases. Vinylamine homopolymer and vinylamine copolymers having large proportions of vinylamine are thus less preferred for use in the barrier layer especially in packaging film utilities. The barrier layers produced from such high vinylamine content polymer frequently craze, crack, and delaminate from the substrate during movement occurring in many end use applications. This behavior can render the gas barrier ineffective and impracticable.

Copolymers of polyvinyl amine that have good film-forming, flexural and pliant mechanical properties are particularly suitable for use in this invention. Preference is given to polyvinyl alcohol/polyvinyl amine (PVOH/PVA) copolymer. Preferably polyvinyl amine content of the PVOH/PVA should be less than about 25 mole %, more preferably less than about 20 mole %, and most preferably less than about 18 mole %. To provide desirable moisture vapor and oxygen barrier performance in packaging films, PVOH/PVA of the barrier layer should contain at least about 5 mole % polyvinyl amine, preferably at least about 8 mole % and more preferably at least about 10 mole %.

Water soluble vinyl amine polymer is preferred. A representative example of vinyl amine polymer suitable for use in this invention is Ultiloc® 5003 BRS (available from Sekisui Specialty Chemicals America, LLC) PVOH/PVA copolymer. It is a nominal 12 mol % vinylamine/88 mol % vinyl alcohol copolymer with an amine content of about 2.3-2.6 meq $NH_2$/gram, a weight average molecular weight of about 10,000-20,000, a viscosity at 20° C. in 4% aqueous solution of about 5-10 cps, (0.005-0.010 Pa·s) a pH in 4% aqueous solution of about 9-12, a glass transition temperature "Tg"

for the powder of about 85-100° C., and a melting point for the powder of about 180-220° C. Ultiloc 5003BRS can be readily dissolved in water up to about 20 wt % non-volatile solids. The term "non-volatile solids ("NVS") refers to the dry concentration of components that may be provided as a liquid or in a liquid medium (such as solid components suspended or dissolved in a liquid) after the liquid is removed by evaporation.

In the barrier layer of this invention the vinyl amine polymer can be crosslinked with an optional crosslinking agent in addition to citric acid. Representative crosslinking agents that are useful for crosslinking vinyl amine polymer in accord with this invention include the following: melamine-based cross-linker, epoxy-based cross-linker, aziridine-based cross-linker, epoxyamide compounds, titanate-based coupling agents (e.g., titanium chelate), oxazoline-based cross-linker, isocyanate-based cross-linker, methylolurea or alkylolurea-based, aldehyde-based, and acrylamide. Preferred additional crosslinking agents are glyoxal and epichlorohydrin.

The precise mechanism by which citric acid modifies vinyl amine polymer to enable achieving the beneficial results of this invention is not presently well understood. Without committing to a particular theory, it is contemplated that using citric acid alone or together with an optional additional crosslinking agent, aids in the formation of the crosslinked vinyl amine polymer network having reduced free volume within the polymeric matrix. This may allow the coating to stretch up to about eight to ten times the original coating dimension without forming barrier layer discontinuities and thus provide improved gas barrier performance.

Formation of the mPVA applicable to this invention may be better understood through explanation of the reaction scheme shown in the following formulae (I)-(IV) in which R is the citric acid radical $HOOCCH_2C(OH)(COOH)CH_2$ and P represents the polymer chain of vinyl amine polymer such as PVOH/PVA copolymer onto which the amine functional group is substituted. In (I) citric acid reacts with polymeric amine to form an ammonium carboxylate salt. Heating to temperature above about 100° C. removes water from the salt and produces polymeric amine in (II). Polymeric amine reacts with deprotonated carboxylic acid anion in (III) to produce crosslinked polymeric amide by further splitting off a hydroxyl anion in (IV). This reaction scheme is surprising because the direct reaction of a carboxylic acid with an amine should be difficult due to known preference of the basic amine to deprotanate the carboxylic acid to form a very unreactive carboxylate. However, it has been discovered that heating the ammonium carboxylate to a temperature above 100° C. drives off water and produces an amide.

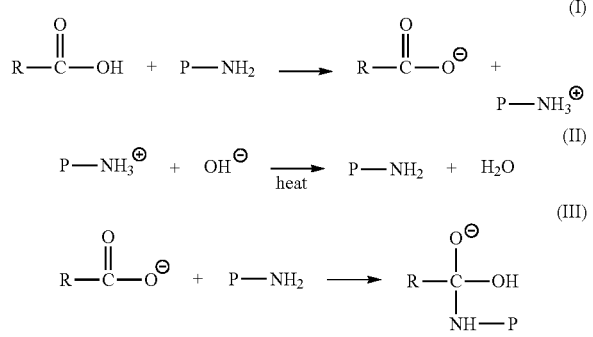

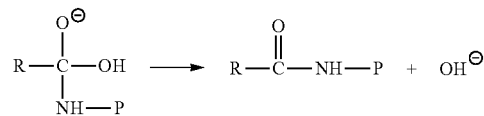

Process

One aspect of this invention relates to formation of a solution that can be coated onto the polymeric base layer as a precursor to a gas barrier layer. The solution includes vinyl amine polymer particles and citric acid particles dissolved in a solvent. The preferred solvent is water. Polar co-solvents with water such as methanol, ethanol, propanol, and mixtures thereof can optionally be used. Preferably cosolvents have volatility sufficiently high to enable rapid evaporation from solution coated film at temperature of at least about 100° C. The amount of solvent is selected to be suitable to completely dissolve all solid components of the solution. Solutions typically have a concentration in the range of about 3-30 wt % total non-volatile solids ("NVS") content, preferably about 10-20 wt %, and more preferably about 12-16 wt %. Concentration of solute in solution can affect solution viscosity. The higher the concentration of non-volatile solids, the more cost-effective the coating becomes as less water needs to be driven off. However, higher solids content increases solution viscosity. If solids content is too high, the solution can be too viscous to easily handle and apply in substrate coating operations. Viscosity of the coating solution is preferably less than about 200 cps (0.20 Pa·s), and more preferably about 100-200 cps (0.10-0.20 Pa·s).

Great preference is given to first substantially completely dissolving the citric acid particles prior to charging and dissolving vinyl amine polymer, in particular PVOH/PVA particles in the solution. Although it is intuitive that vinyl amine polymer particles and citric acid particles could be dissolved in any order or together, it is understood that adding vinyl amine polymer after citric acid is dissolved provides better (i.e., lower) coating solution viscosity, shear stability, solution storage stability and superior gas barrier properties in the ultimately formed barrier film. The mixtures of vinyl amine polymer, citric acid and water can be heated to increase the rate of dissolution. Typical dissolving temperature is in the range of about 85° C.-100° C. Dissolving is also usually facilitated by moderate agitation of the mixture and normally is completed within about 15-60 minutes.

The amount of citric acid depends mainly on the quantity of PVA polymer in solution. The citric acid should be present to provide carboxylic acid functional groups at least stoichiometrically equal to the reactive amine in the vinyl amine polymer. Preferably acid:amine weight ratio should be in the range from about 0.1:1 to about 0.3:1, more preferably from about 0.13:1 to about 0.17:1 and most preferably about 0.15:1.

A process parameter for effectively controlling the proper proportion of citric acid to PVOH/PVA copolymer is pH of the liquid aqueous coating solution. A typical aqueous solution of about 14 wt % PVOH/PVA has a pH of about 11-12. Adding citric acid to solution lowers the pH. Generally, the more citric acid, the lower pH of solution and the greater extent of crosslinking of PVOH/PVA can be expected. A significant amount of citric acid crosslinking of the PVOH/PVA is desirable to achieve enhanced oxygen barrier properties in the barrier layer.

Results summarized in Table 1 of a series of experiments, suggest that too much crosslinking reduces flexibility and tensile strength of the barrier layer in a composite film. Consequently, an excessively crosslinked barrier layer composition cannot be biaxially stretched with the base layer to desirable stretch factors. A more rigid barrier layer tends to be brittle, craze and crack causing poor structural and appearance quality especially for packing film as well as poor barrier performance. In these examples a selection of aqueous coating solutions were prepared and coated onto biaxially stretched polypropylene base layer polymer film. The coating was heated to remove water and crosslink the copolymer of the coating when citric acid or crosslinking agent was present. Film samples were subjected to flexibility testing with a Gelbo Model 5000ES Flex tester (United States Testing Co., Inc, Hoboken, N.J.). After increasing number of twist and compression cycles, samples were tested for oxygen and moisture vapor transmission resistance. The tabular data shows the effect on transmission resistance of solution pH used to make the coatings.

In these examples, sample S1.1 barrier composition solution was a non-amine containing non-crosslinked, PVOH polymer/EVOH copolymer blend. The oxygen transmission rate (OTR) was very high with no flexing and remained high as flexing cycles increased. To make sample S1.3, citric acid was reacted with PVOH/PVA copolymer in proportion to obtain a solution pH of 5. Compared to S1.1 the OTR dropped nearly order of magnitude with zero flexing compared to the control thus demonstrating the efficacy of the mPVA barrier layer. OTR for this sample did increase slightly as flex cycles increased but remained well below the control. Sample S1.2 was produced with a solution that had slightly more citric acid than S1.3 to provide lower pH of 4 and included 0.12 wt % of Polycup® 9200 epichlorohydrin (Ashland Inc., Columbus Ohio) additional crosslinking agent. Results were similar to S1.3. Sample S1.4 was produced with a solution that had the same citric acid concentration as S1.3 except added more epichlorohydrin crosslinking agent than S1.2. OTR performance was very similar to S1.2 and S1.3, showing that the added crosslinking agent is permissible but does not significantly increase barrier performance. A possible explanation is that in samples S1.2-S1.4 the PVOH/PVA could have been substantially completely crosslinked by citric acid such that adding extra crosslinking agent only negligibly contributed to further crosslinking. OTR of sample S1.5 was noteworthy in that less citric acid was in solution that otherwise duplicated solution of S1.2 causing solution pH to rise from 4 to 7. The OTR result at zero flex cycle was lowest of the samples. Also, OTR remained very low as flex cycles increased. This behavior is construed as showing that the attenuated citric acid crosslinking made for a more supple and pliant barrier layer that was able to endure flexing to maintain enhanced barrier performance. MTVR results for all the samples were significantly lower than the S1.1 control and remained relatively constant as flex cycles increased. From these experiments it is understood that citric acid should be added to the PVOH/PVA copolymer coating solution in quantity to provide pH in the range of about 4-8 more preferably about 4-7, and most preferably about 4-5.5. Film made within these parameters is expected to provide a dried coating flexible enough to enable extending a biaxially stretched film by a factor of about 3-10 times its original transverse direction dimension without sacrificing of excellent gas barrier properties derived from the mPVA barrier layer.

TABLE 1

|  | pH | OTR cm$^3$/100 in$^2$/day | OTR cm$^3$/m$^2$/day | OTR cm$^3$/100 in$^2$/day | OTR cm$^3$/m$^2$/day | OTR cm$^3$/100 in$^2$/day | OTR cm$^3$/m$^2$/day | OTR cm$^3$/100 in$^2$/day | OTR cm$^3$/m$^2$/day |
| --- | --- | --- | --- | --- | --- | --- | --- | --- | --- |
| Flexural Cycles |  | 0 | 0 | 1 | 1 | 3 | 3 | 6 | 6 |
| S1.1 PVOH/EVOH |  | 0.750 | 11.6 | 0.850 | 13.2 | 0.789 | 12.2 | 0.884 | 13.7 |
| S1.2 mPVA 0.12 wt % Epichl'rin | 4 | 0.039 | 0.60 | 0.086 | 1.33 | 0.120 | 1.86 | 0.154 | 2.39 |
| S1.3 mPVA | 5 | 0.023 | 0.36 | 0.055 | 0.85 | 0.080 | 1.24 | 0.119 | 1.84 |
| S1.4 mPVA 0.20 wt % Epichl'rin | 5 | 0.030 | 0.47 | 0.030 | 0.47 | 0.090 | 1.40 | 0.080 | 1.24 |
| S1.5 mPVA 0.12 wt % Epichl'rin | 7 | 0.021 | 0.33 | 0.051 | 0.79 | 0.065 | 1.01 | 0.039 | 0.60 |

|  | pH | MVTR g/100 in$^2$/day | MVTR g/m$^2$/day | MVTR g/100 in$^2$/day | MVTR g/m$^2$/day | MVTR g/100 in$^2$/day | MVTR g/m$^2$/day |
| --- | --- | --- | --- | --- | --- | --- | --- |
| Flexural Cycles |  | 1 | 1 | 3 | 3 | 6 | 6 |
| S1.1 PVOH/EVOH |  | 0.101 | 1.57 | 0.100 | 1.55 | 0.111 | 1.72 |
| S1.2 mPVA 0.12 wt % Epichl'rin | 4 | 0.072 | 1.12 | 0.074 | 1.15 | 0.072 | 1.12 |
| S1.3 mPVA | 5 | 0.074 | 1.15 | 0.073 | 1.13 | 0.073 | 1.13 |
| S1.4 mPVA 0.20 wt % Epichl'rin | 5 | — | — | 0.072 | 1.12 | 0.070 | 1.09 |
| S1.5 mPVA 0.12 wt % Epichl'rin | 7 | 0.075 | 1.16 | 0.075 | 1.16 | 0.076 | 1.18 |

Additional solvent-miscible liquid and solvent-soluble, solid components optionally can be added and dissolved in the coating liquid aqueous solutions. Usually these added components are present in small proportions relative to vinyl amine polymer and citric acid. For example, methanol and Dowanol™ DPM dipropylene glycol methyl ether (The Dow Chemical Company) "DPM" can be incorporated in the aqueous barrier layer precursor solution at about 2-20 wt %, and preferably about 10-15 wt %, of the NVS components in the solution. These materials are included to improve the wetting performance of the solution on the surface of the substrate polymeric film for more uniform and complete liquid coating and barrier layer formation.

Another important aspect of preferred embodiments of this invention relates to forming the polymeric base layer, coating the barrier layer precursor solution on a surface of the base layer, and post-coat treating the film. Post-coat treatment includes removing volatile liquid of solution and crosslinking the vinyl amine polymer with citric acid, optionally with additional crosslinking agent, to form a composite of dry, solid barrier layer adhered to the base layer, stretching the composite film and further optionally heat treating the composite film. Preferably according to this invention, base layer formation, barrier layer solution coating and post-coat treatment are carried out in a continuous, integrated series of steps. In effect, the crosslinking can occur during drying and stretching.

Polymeric base layer formation is preferably accomplished using conventional continuous film extrusion unit operation technology. Raw material polymer resin is typically supplied in pellet form. It may be dried to low moisture levels before being heated to a molten state for extrusion. Equipment used in these operations include well known polymer melt processing extruders with film-forming dies that extrude a molten film onto quenching chill rolls that solidify the film. The film then passes through sequential series of rolls running at different speeds to stretch the film in a longitudinal, so-called machine direction. The film may be heated in connection with machine direction stretching to obtain preselected morphological effects in the polymer.

Formation of the mPVA barrier layer according to the scheme of reactions (I)-(IV) calls for presence of citric acid and vinyl amine polymer in a suitable aqueous liquid reaction medium with appropriate heating and dehydration conditions. Citric acid and amine reaction temperature for the polyamide formation can occur in the range of about 70° C.-185° C. The reaction proceeds faster at higher temperatures. Also, drying of solvent occurs more rapidly at higher temperatures. It has been discovered that conditions of biaxial polymer film fabrication are commercially ideal for forming the dried barrier layer, especially on a base layer of polyolefin or polyester. At temperatures between about 150° C. and about 185° C., the amine-citric acid reaction rate and the removal of solvent by vaporization from the aqueous liquid coating solution are such that a dry barrier layer of mPVA can be formed on the base layer within a residence time normally of less than about 1 minute, preferably from about 5-30 seconds, and more preferably in the range of about 10-20 seconds. These durations match reasonably well with the time that a polyester or polyolefin film undergoes transverse direction stretching in biaxially oriented film fabrication processes.

Thus it is quite advantageous to make the novel barrier packaging film composite in existing commercial continuous, biaxially oriented film production units equipped with an in-line liquid coating station with slight operating adjustments. This is accomplished by depositing the liquid barrier layer coating solution onto a base layer film directly after machine direction stretching, and then heating the solution-coated base layer while stretching the film in the transverse direction in a tenter frame oven for a residence time as recited above effective to react citric acid with the polyvinyl amine and to evaporatively remove substantially all of the liquid of solution. Generally, the solution-coated base layer film is heated to 90° C.-185° C. Due to their physical properties, some process conditions for different base layer polymers can be different. Polyester base layer films are preferably heated to about 90-121° C. and stretched in the transverse direction by a stretch factor of about 3-4. Polyolefin base layer films are preferably heated to about 150-180° C. and stretched by a stretch factor of about 8-10.

It is also preferable to "anneal" (also known as "heat-setting") the film at appropriate temperatures after stretching in order to minimize shrinkage of the composite film and to provide a dimensionally and thermally stable film. Annealing can be performed in the tenter frame oven. Typically a tenter frame oven has multiple heating zones that can be controlled at different temperatures. The annealing usually occurs in heating zones that follow heated stretching zones in the oven. Heat shrinkage of the composite film after orientation is determined substantially according to ASTM D1204. For composite film with a polypropylene base layer shrinkage determination conditions are 284° F. (140° C.) for 15 minutes. For composite film with a polyethylene terephthalate base layer, shrinkage determination conditions are 300° F. (150° C.) for 30 minutes. Preferably, heat shrinkage of the composite films should be less than about 10% for polyolefin and less than about 5% for polyester.

This invention is deemed suitable for implementation by two basic types of process methods, namely, "off-line" and "inline" methods. The procedures for film stretching and applying the barrier layer coating solution distinguish these methods as will be explained. In polymer morphology orientation can involve alignment of the structural elements of the polymer, for example, polymer chains, segments of chains and crystallites. Orientation can cause anisotropic physical properties in a polymer product. For a polymer film, orientation can be induced by stretching the film. In this disclosure, the terms "orientation", "orienting", "oriented", and the like are used occasionally, whether or not accompanied by alignment of polymeric structural elements, and are meant to be interchangeable with corresponding terms, "stretch", "stretching", "stretched" and etc. In most high volume, polymeric film production, the film is formed continuously by extrusion and elongation in which the direction of material flow is commonly known as the "machine direction", Typically, the first technical direction is the machine direction and the second technical direction is the cross-machine or "transverse direction" (i.e., in the plane of the film at 90° to the machine direction.

According to this invention, film may be unoriented, uniaxially oriented or biaxially oriented. Uniaxially oriented means that the film is stretched only in a first technical direction. Biaxial orientation occurs when a uniaxially oriented film is stretched in a second technical direction transverse to the first technical direction. Biaxial orientation can be achieved by stretching the film in both directions, either sequentially or simultaneously. For sequential biaxial orientation, first technical direction stretching is completed before stretching in the second technical direction. In simultaneous biaxial orientation, both first and second direction stretching occur at or near the same time.

In an "off-line" method the base layer film completely is formed and then wet barrier layer coating solution is applied to the completed base layer. When called for, optional skin and/or adhesive layers are added to the core layer to complete base layer formation in the first stage of the off-line method. In the off-line method the barrier layer solution can be applied to a uniaxially stretched base layer, but typically the base layer is biaxially stretched. Commonly, although not necessarily, the steps of base layer film forming and barrier layer solution coating are performed discontinuously from each other. That is, the base layer film can be produced, stretched and held in storage for coating at a subsequent time and usually at a different location.

After production of the base layer, it is subjected to coating with the barrier layer liquid solution. Various solution coating methods well known in the art may be used. Representative examples include dip, spray, paint, doctor, gravure and Mayer (sometimes referred to as "Meyer") rod type techniques. Preferably a Mayer rod coater with a No. 2 or No. 4 Mayer rod can be used. It is also sometimes helpful to ion discharge-treat the coating receiving side of the base layer prior to coating to improve adhesion of the barrier layer and/or to wet-out (i.e., uniformly spread) the coating liquid onto the base layer surface. Such discharge-treatment methods are well-known in the art as corona treatment, flame treatment, plasma treatment, atmospheric plasma treatment, or corona treatment in a controlled atmosphere.

After coating the base layer surface with barrier layer liquid solution, a solidified barrier layer is formed heating the wet base layer. The heat both dries the barrier layer by evaporating volatile liquid components and causes reactive components to crosslink the residual vinyl amine polymer of the liquid solution. Off-line coating separate from base layer film formation can be carried out in a continuous film coating operation.

In an embodiment of this invention a more discontinuous off-line process is employed. After applying coating solution, volatile components are removed in a static oven at drying temperatures such that the coating is fully dried and crosslinked and the base layer experiences minimal thermal shrinkage. Care is recommended because the static film can be overheated in the oven such that damage to the composite film can occur, such as undesirable deformation of wrinkling, shrinkage and the like. To avoid such results, drying temperature in the static oven of the off-line method should be kept relatively low. For example, temperatures as low as about 75-80° C. might be suitable for drying. A potential problem of drying at too low a temperature is that the heat energy transmitted to the film is not sufficient to fully activate the cross linking to form mPVA according to reactions (I)-(IV), above. Thus to make a composite barrier film with effective moisture and oxygen resistance by the off-line method, attention must be given to balancing temperature and residence time conditions in the static oven.

The inline production method is a preferred embodiment of the invention. Basically, in this process, the base layer is formed, coated with liquid barrier layer solution, and heated to dry and crosslink the vinyl amine polymer in a unified and continuous process. According to other preferred embodiments, additional steps can be included, for example the base layer can be uniaxially stretched before coating with liquid solution. Also the barrier layer can be dried, crosslinked and stretched at the same time or in rapid succession after coating. Still further, the composite barrier film can be heat-treated to anneal the film after the barrier layer is formed.

A major advantage of the inline method is that time and temperature of heat exposure during solution drying can be controlled very well. This permits higher temperatures to be used for appropriately short times. Consequently, the barrier layer solution can be dried with effectively complete crosslinking of the vinyl amine polymer with reduced risk of damaging the film. Also, in the inline process, drying and crosslinking can be accomplished at or very near the same time as stretching the base layer in at least one direction. It has been found that such contemporaneous drying, crosslinking and stretching can significantly further improve transmission resistance performance. Thus a particularly preferred embodiment of inline process includes the continuous, sequential steps of (a) forming a polymer core layer, (b) optionally adding an adhesive layer and/or a skin layer to make the base layer (c) stretching the base layer, preferably uniaxially in the machine direction, (d) coating the base layer with liquid solution of vinyl amine polymer and citric acid, (e) heating the coated base layer effectively to dry and crosslink the vinyl amine polymer to form an mPVA barrier layer, (f) optionally stretching the composite barrier film in the transverse direction during or immediately following the drying and crosslinking step, and (g) optionally heat treating to anneal the composite barrier film. When present as a component of the base layer, step (d) coating is applied to the surface of the adhesive layer.

More fully explained, the inline method includes extruding a web of polymer from granulated solid form such as pellets in a melt processing apparatus. Continuously following extrusion, the web is stretched in the first technical direction, usually the machine direction. The solution coating apparatus is positioned directly after the base layer is formed and uniaxially stretched. Liquid coating solution is applied while the base layer moves continuously through the coating apparatus application station. The same solution coating technologies described above for off-line coating may be used for placing the wet coat of barrier layer solution on the polymer base layer. For the inline method, reverse gravure roll coating techniques are preferred.

Directly and continuously following liquid solution coating of the base layer, drying, crosslinking and preferably biaxial stretching steps are performed in rapid succession. In-line fabrication can use the same composite barrier film finishing methods as described for "off-line", but instead of using a static oven, the film is continuously fed through a tenter frame stretching oven. The tenter frame stretching oven has several heating zones so that different segments of the process can be at temperatures tailored to accomplish each unit function. For example, the wet coat volatiles can be substantially completely removed to form a dry unitary barrier layer adhered to the substrate surface in preheating and drying heat oven zones. Then temperature can be adjusted to a range adapted to activating crosslinking of the vinyl amine polymer by citric acid and to biaxial stretching of the composite barrier film. Preferably the barrier layer is fully dried before crosslinking and biaxial stretching. In a nominal 1.5 m wide tenter frame stretching oven at film machine direction travel speed of about 80 ft/min. (24 m/min.), typical crosslinking and biaxial stretching zone temperatures of the inline method are in the range of 155-160° C. for polypropylene base layer film, and in the range of about 90-121° C. for polyethylene terephthalate base layer film. These operating temperatures are much higher than should be used in the off-line method. Higher temperature can be tolerated during inline processing because the flow of film is continuous through the heat zones and time and temperature exposure can be controlled to avoid damaging the film. In another embodiment, some or all of the liquid solvent removal occurs and the barrier layer is crosslinked with citric acid and optional crosslinking agent during oven heating while conducting transverse stretching. After transverse stretching, the film can be heat-set to minimize shrinkage.

It has been discovered that the citric acid crosslinked mPVA barrier layer can be stretched to large transverse extensions while remaining intact and maintaining good barrier properties over the full surface of the multilayer film. This performance is predominantly observed when the wet coating solution is applied to an already uniaxially stretched base layer, and the barrier layer is contemporaneously dried, crosslinked and biaxially stretched This occurs in both mPVA crosslinked by citric acid with or without optional a supplemental crosslinking agent, such as epichlorohydrin. The barrier layer has been found to successfully extend to about 3-4.5 times its original transverse dimension, (i.e., 3x-4.5x) which is a property suitable for lower extension substrate materials such as polyesters. It is also able to extend to as much as 8 times original transverse dimension (i.e., 8×-10×) that is useful for higher extension capable substrate materials such as polyolefins, especially polypropylene base layer films.

Additional Materials

In addition to the basic components of substrate polymer and PVOH/PVA, citric acid, crosslinking agent and solvent of the barrier layer, other materials may be present in the liquid coating solution. These other materials facilitate the preparation, processing and coating of the solution, processing the base layer formation or product film handling. These materials are usually incorporated in small proportions relative to the basic components and do not substantially change the gas barrier properties of the invention.

Such other materials that can be optionally utilized in carrying out this invention include preservatives or biocides for maintaining freshness of the coating solution during storage. A representative example is Ultra-Fresh® SAB40 (also known as Bioban® bp-40 available from Dow Chemical Company).

Although preference has been stated to have an optically clear barrier film, it is also contemplated that certain packaging or other utilities can call for a metalized barrier film. Thus in another aspect of this invention the composite barrier film can have an optional, additional metal layer. If present, the metal layer is preferably positioned on the exposed surface of the barrier layer opposite the base layer. The metal layer is deposited after the barrier layer is dry and solidified. To more easily apply and to obtain better quality, more durable metal layers, the surface of the dried barrier layer coating may be treated (sometimes referred to as "discharge treatment") prior to adding the metal layer. Treating can increase the surface energy and/or to provide suitable additional chemical functional groups thereby facilitating metal deposition and improve metal-to-barrier layer attachment. Such surface treatment may be accomplished by various means well-known in the art. Examples of suitable surface treatment methods include electrical corona in air, flame, plasma, atmospheric plasma, and corona in a controlled atmosphere such as carbon dioxide and nitrogen gas, to the exclusion of oxygen gas. The latter method is preferred as it can place nitrogen-bearing chemical functional groups onto the barrier layer surface that corona or flame treatment do not provide. Preferably this technique adds at least about 0.3 atomic % nitrogen-containing functional groups, and more preferably at least about 0.5 atomic %).

Metallizing of the barrier layer surface may be accomplished by various means well-known in the art. For example, vapor deposition can be used. Basically according to this technique, unmetallized composite barrier film is unwound from a roll and the metal receiving surface is exposed to a source of vaporized metal within a vacuum chamber. The metal layer can comprise metal, metal oxides and mixtures thereof. Examples of metal that are deemed useful include titanium, vanadium, chromium, manganese, iron, cobalt, nickel, copper, zinc, aluminum, gold, palladium to name a few. Aluminum is preferred. The preferred metal oxide is aluminum oxide because it can provide a highly transparent finished film. The thickness of the metal layer generally is about 5-100 nm, preferably about 20-80 nm, and more preferably about 30-60 nm. Thickness of the metal layer can also be characterized by optical density of the metalized film. Optical density of a metallized composite barrier film according to this invention is generally about 0.5-5.0, preferably about 2.0-4.0, and more preferably about 2.2-3.2. At lower optical densities such as 1.0 or less, the metallized film may demonstrate a degree of transparency. At optical densities greater than about 2.0 usually render the metallized film opaque. After metallization the film can be tested for oxygen and moisture permeability, optical density, and adhesion of the metal layer to the composite barrier film.

EXAMPLES

This invention is now illustrated by examples of certain representative embodiments thereof, wherein all parts, proportions and percentages are by weight unless otherwise indicated. All units of weight and measure not originally obtained in SI units have been converted to SI units. The entire disclosures of U.S. patents and patent applications named in the following examples are hereby incorporated by reference herein.

Analytical methods used in the examples were as follows:

Moisture vapor transmission rate (MVTR) of film was measured with a Permatran® 3/31 Water Vapor Transmission Rate Testing Device (Mocon Inc., Minneapolis Minn.) substantially in accordance with ASTM F1249.

Oxygen transmission rate (OTR) of film was measured with a Mocon Ox-Tran® 2/20 Oxygen Permeability Testing Apparatus (Mocon Inc., Minneapolis Minn.) substantially in accordance with ASTM D3985.

Unless otherwise noted, films analyzed for MVTR and OTR were laminated to a substrate of PATCO 502A low density polyethylene/acrylic adhesive pressure sensitive tape (Berry Plastics, Bristol, R.I.) adhered to the barrier layer to simulate a typical finished package structure.

Film Appearance: Samples of 8½"×11" (21.6 cm×28 cm) size were cut from barrier coated film sheets and were visually inspected for defects such as irregular thickness of coating, uncoated spots, discoloration, and breaks. Appearance was rated using a scale of 1-4 corresponding based on the following characteristics:

1=Large preponderance of defects, very poor appearance.
2=Some defects.
3=Few defects.
4=No visible defects, excellent appearance.

A rating of at least 3 was deemed acceptable.

Preparation of Polyethylene Terephthalate Base Layer (PET-01)

A 1.5 m wide base layer of polyethylene terephthalate having a skin layer and adjacent core layer was prepared by continuous coextrusion according to this procedure. Film grade resin PET (Lumirror® F21MP, Toray Plastics (America), Inc., North Kingstown, R.I.) of about chips 95 wt % was blended with an anti-block masterbatch resin of about 5 wt % of PET (Lumirror® F118) containing about 2.0 wt % Silysia® YS-2 (Yugenkaisha Y.K.F. Corporation, Japan) of nominal 2.6 µm size cohesive silica particles to make a skin layer composition. About 60 wt % of an amorphous copolyester Eastar® 6763 (Eastman Chemical Company, Kingsport, Tenn.) of composition terephthalic acid copolymerized with 33 mole % 1,4-cyclohexane dimethanol (CHDM) and 67 mole % ethylene glycol was blended with about 40 wt % Lumirror F21MP to make a core layer composition.

A core/skin film was formed by coextruding the molten core layer and skin layer composition from separate extruders through a common film casting die. Skin layer composition and core layer composition extruder temperatures were about 275° C. to 282° C. and about 260° C. to 265° C., respectively. The extruded film was cast onto a cooling drum of surface temperature at about 21° C. moving at a linear speed of about 8 m/min. The film was oriented in the machine direction through a series of heated and differentially sped rolls by extending in the longitudinal direction at about 75° C. to 85° C. at a stretching factor of about 3 times the original length followed by annealing at about 75° C. to obtain a uniaxially oriented film.

Preparation of Polypropylene Base Layer (PP-01)

A 1.5 m wide skin layer/core layer/adhesive layer polypropylene base layer was prepared by continuous coextrusion according to this procedure. The core layer composition was about 80 wt % Copylene® CH020XK polypropylene homopolymer (Phillips 66 Company Corporation Delaware) mixed with about 20 wt % of a precompounded masterbatch of about 50 wt % Oppera® PR100A hydrocarbon polymeric resin modifier (Exxon Mobil Corporation) and about 50 wt % of Total 3271™ (Total Petrochemicals, Houston Tex.) polypropylene homopolymer. The skin layer polymer composition was a blend of Sumitomo Chemicals ethylene-polypropylene copolymer SPX78R6 (about 70 wt %) and Vistamaxx™ 3980FL (Exxon Mobil Corporation) ethylene-polypropylene copolymer (about 30 wt %). The skin layer also included about 3000-5000 ppm particles of about 2 μm diameter of Momentive Tospearl™ 120 crosslinked silicone polymer spherical antiblock agent. The adhesive layer composition was Admer® QF500A maleic anhydride-grafted polypropylene (Mitsui Chemicals America, Inc.).

The polypropylene layer compositions were melted and separately fed by three extruders to a common sheet forming die to coextrude the multilayer composite film structure. The coextruded film was cast onto a chill drum using an air knife, stretched in the machine direction using a series of heated and differentially sped rolls. Coextrusion melt temperature to form the film was about 230° C. to 250° C. Cooling drum surface temperature was about 20° C. to 26° C. and film speed was about 4.5 m/min. Machine direction stretching occurred at about 104° C. to 120° C. at a stretching factor of about 4.75 times the original length. The stretched sheet was annealed at about 30° C. to 45° C. to obtain a uniaxially oriented laminate film.

Procedure for Coating Base Layer with Barrier Layer

Aqueous liquid coating solutions for each example were prepared. The liquid coating solutions were applied to uniformly coat a surface of uniaxially oriented base layer PET-01 or PP-01. The water solvent of solution was removed by heating the wet-coated base layer. When citric acid and/or additional crosslinking agent were present in the coating solution, crosslinking of the barrier layer composition also was accomplished during solvent removal. For biaxially oriented film examples, the coated uniaxially oriented base layer was stretched in the transverse direction (TD) in a tenter oven unit operation. The base layer polymer of the resulting biaxially oriented composite packaging film was heat set following TD stretching.

Deposition of the liquid coating solution and subsequent treatment of the composite film was performed in either an "inline" or an "offline" process. The inline process placed the polymeric barrier layer liquid coating solution onto the base layer immediately following the uniaxial orientation step in a continuous train of integrated process steps as described previously for the preparation of PET-01 and PP-01. In the case of PET-01, the barrier layer was placed on the core layer side of the base layer. For PP-01, the barrier layer was placed on the adhesive layer side of the base layer.

For inline barrier coating of the examples, the exposed surface of the uniaxially oriented base layer of film PET-01 was corona discharge treated. Liquid solution of barrier layer composition was continuously coated onto the treated surface of the core with a gravure roll coating system of 22 BCM (billion cubic microns). The barrier layer solution-coated film was then fed at a line speed of about 24 m/min. into a 30 ft (9.1 m) long, tenter oven having three equal length heat zones. First, second and third heat zones, were maintained at about 80° C., 88° C. and 215° C., respectively. The first zone preheated the coated barrier layer. In the second zone, the coated barrier layer was stretched in the transverse direction about 3-5 times its initial transverse direction dimension. The composite barrier film was heat-set/annealed in the third zone as appropriate to reduce internal stress caused by stretch-orientation and to minimize shrinkage, thereby providing a thermally stable biaxially oriented, crosslinked barrier, composite barrier film.

The exposed surface of the dried coated barrier layer was given a corona discharge treatment so as to be suitable for subsequent potential metallizing. The composite barrier film was wound into a roll for further processing. Nominal dimensions of the finished film were: about 48 gauge, "G" (ca. 12 μm) overall thickness, about 5 G (1.3 μm) skin layer thickness, 43 G (ca. 11 μm) core layer thickness, and about 1 G (0.25μm), equivalent to about 0.20 lb/ream (0.325 gsm) thickness of the dried and crosslinked barrier layer.

An inline coating process similar to that described above for coating the polyethylene terephthalate base layer PET-01 was employed to coat the uniaxially stretched polypropylene base layer PP-01. A barrier layer solution was deposited on the exposed side of the adhesive layer using an inline gravure coater with a 45 BCM cut, running in direct reverse gravure orientation with a backing roll after which the coated film was further processed by transverse stretching in the same tenter oven as used for biaxial stretching PET-01. First and second heat zones were maintained at about 150-180° C., and the third heat zone was at about 147-157° C. The film was biaxially stretched in the transverse direction about 8-10 times its initial transverse direction dimension. Finally, the exposed surface of the barrier layer was given a corona discharge treatment so as to be suitable for subsequent potential metallizing, and the multilayer film was wound in roll form for further processing. After biaxial stretching, nominal thickness dimensions of the coextruded film were: overall film thickness about 80 G (20 μm), skin layer about 4 G (1.0 μm), adhesive layer about 5 G (1.3 μm), and core layer about 71 G (ca.18 μm). The dried and crosslinked barrier layer thickness varied between about 0.3 G (0.075 μm) and 1.0 G (0.25 μm); preferably the dried coating thickness was about 0.6 G equivalent to about 0.12 lb/ream (0.20 gsm). For comparative examples without a barrier layer coating on the base layer, the same transverse direction stretching and heat treatment was the same as described for making the barrier layer coated film except that the gravure coating unit was bypassed. Although no barrier coating composition was applied, the skin layer was also subjected to corona discharge treatment. Film made this way without a barrier layer coating applied by the inline method could be suitable for subsequent coating in a separate off-line coating step.

During the inline coating and TD stretching unit operations to form the biaxially oriented polyethylene terephthalate base layer and polypropylene base layer films, the temperature and duration of exposure conditions for each film, respectively, were effective to vaporize the volatile components of the liquid barrier coating solution. This produced a uniform and continuous solid polymeric barrier layer affixed to the base layer. In the examples representing operative embodiments of this invention in which PVOH/PVA and citric acid were present, the conditions of TD stretching were effective to also cause amine-acid reaction as well as additional crosslinking when optional crosslinking agent was present.

For examples of coating by the off-line process a fully formed biaxially stretched film was first produced without an in-line barrier coating step, as described previously, and wound on a roll for subsequent coating. The biaxially oriented film was unwound, samples were cut to convenient size (e.g. 8.5" by 11" dimensions), and liquid coating solution of about 8 wt % NVS was manually applied using a number 4 Meyer rod. Solvent was removed and crosslinking was achieved as applicable in a static oven. For a coated PET base layer film, the drying condition was about 220° C. for 10-20 seconds until dry to the touch. For coated polypropylene base layer film, the drying condition was about 150° C. for 10-20 seconds until dry to the touch. Therefore the off-line processed films did not undergo any additional transverse orientation and the additional high temperature heats associated with this sequential transverse orientation step as in the in-line film coating process.

Preparation of Barrier Layer Coating Solutions

Unless otherwise indicated the PVOH/PVA barrier layer compositions in the examples used Selvol™ Ultiloc™ 5003 BRS (Sekisui Specialty Chemicals of America, Dallas Tex.) 12 mole % vinyl amine/88 mole %/vinyl alcohol copolymer.

Composition characteristics, process conditions and analytical results of physical properties for barrier films produced according to the examples are presented in Table 2, below.

Example 1 and Comparative Examples 1 and 2

Comparative Example 1 produced a control film of PET-01 with a polyvinyl alcohol (PVOH) and ethylene vinyl alcohol (EVOH) blend barrier coating layer crosslinked by gyloxal. This film exhibited an OTR value of 0.420 cm³/100 in²/day (6.52 cm³/m²/day) that is typical for a conventional composition nonmetallized, clear coated PVOH/EVOH-based barrier layer coated on mono-directionally stretched PET film and then stretched transversely 4.5×. The PVOH used in Comparative Example 1 was Celanese International Corporation's Celvol® 502 which is a 4 wt % solids, partially hydrolyzed PVOH solution with about 88.00+/−1.00 mole % hydrolysis and viscosity of about 3.35+/−0.35 cP. The EVOH used was Kuraray America Inc.'s Exceval® 2117 grade which is a fully hydrolyzed EVOH of viscosity 23.0-30.0 mPa-sec of a 4 wt % solids aqueous solution at 20° C. determined by Brookfield synchronized rotary-type viscometer; 97.5.0-99.0 mol-% degree of hydrolysis; 0.4 wt % maximum ash content calculated as $Na_2O$; and 5.0 wt % maximum volatile content after 3 hours drying at 105° C. with methanol content less than 3.0 wt %. The ratio of PVOH to EVOH was about 58.6 wt % PVOH to about 28.25 wt % EVOH of the dried coating.

In addition, Freechem® 40DL glyoxal crosslinker (a glyoxal crosslinker composed of ethanedial with about 40 wt % NVS, less than about 0.8 wt % residual acid, a pH of about 3.0, a specific gravity of about 1.270, a boiling point of about 110° C., and a melting point of about 15° C.) was added to the PVOH/EVOH coating solution at about 10-13 wt % of the dried barrier coating, and preferably about 12 wt %; and Surfynol® 420 defoaming surfactant (ethylene oxide content of about 1.3 mol % or about 20 wt %, specific gravity at 25° C. of about 0.943, pH in a 1% aqueous solution of about 6-8, viscosity at 20° C. is <250 cps, hydrophile-lipophile balance is about 4, and volatile organic compound content by EPA method 24 of about 28 wt %) was added in an amount of about 0.7-0.9 wt % of the dried barrier coating.

In Comparative Example 2 the barrier layer was epichlorohydrin crosslinked PVOH/PVA. The PVOH/PVA was about 98.2 wt % and the epichlorohydrin about 0.98 wt % of the dried barrier coating. The excellent OTR value of 0.026 cm³/100 in²/day (0.40 cm³/m²/day) showed substantial improvement relative to the PVOH/EVOH barrier layer of Comp. Ex. 1 barrier. Operative Example 1 was similar to Comp. Ex. 2 except that a citric acid modifier in quantity effective to produce an aqueous coating solution pH of about 5 was added, such that the citric acid was about 13.82 wt % of the dried coating. PVOH/PVA content of the barrier layer of Ex. 1 was about 84.63 wt % of the total dried coating; and the amount of epichlorohydrin was about 0.85 wt % of the dried coating. This change reduced OTR to a value of 0.008 cm³/100 in²/day (0.12 cm³/m²/day), far superior to both Comparative Examples 1 and 2. It is noted that these exemplary films including barrier layer coating were capable of transverse stretching to 4.5 times original transverse dimension.

Examples 2 to 5 and Comparative Examples 3 and 4

Comparative Example 3 was another control film similar to composition of Comp. Ex. 1 except that the substrate polymer was PP-01 and transverse stretching after applying the barrier layer solution was 8 times original dimension. OTR value was 0.80 cm³/100 in²/day (12.41 cm³/m²/day). This value is typical for conventional composition nonmetalized, clear coated PVOH/EVOH-based barrier layer coated on bi-directionally stretched polypropylene film. Comparative Example 4 was a control film composition similar to Comp. Ex. 2 except that polypropylene was the base layer polymer. No oxygen or moisture vapor transmission rate values could be obtained for Comp. Ex. 4 because the epichlorohydrin crosslinked PVOH/PVA barrier layer could not withstand transverse stretching to 8 times original dimension and the dried barrier coating exhibited cracks and voids.

Operative Example 2 was a polypropylene base layer composite that had a barrier layer of citric acid crosslinked PVOH/PVA with epichlorohydrin additional crosslinking agent. The barrier layer precursor solution incorporated citric acid in amount to obtain pH of 5; the amount of citric acid was about 13.82 wt % of the dried coating. The amounts of PVOH/PVA and epichlorohydrin were about 84.63 wt % and 0.85 wt %, respectively, of the dried coating. After drying the barrier layer and transverse stretching to 8× of the initial dimension, an OTR value of 0.040 cm³/100 in²/day (0.62 cm³/m²/day). This barrier property exhibited very low OTR value, was far superior to Comp. Exs. 3 and 4, and would be very suitable for very high oxygen barrier packaging applications. However, the example demonstrates that citric acid crosslinking permitted the barrier layer to stretch much farther than the epichlorohydrin only crosslinked sample of Comp. Ex. 4 while providing excellent oxygen transmission resistance.

Example 3 repeated conditions of Ex. 2 except that less citric acid was used to provide a less acidic barrier coating solution pH of 9. The amount of PVOH/PVA was about 90.77 wt % and the amount of citric acid was about 7.56 wt % of the dried coating, respectively. The barrier layer was able to stretch in the transverse direction by a factor of 8 and the oxygen transmission rate was higher than Example 2 at 1.213 cm³/100 in²/day (18.8 cm³/m²/day). However, Example 3 demonstrated that citric acid crosslinking permitted the barrier layer to stretch much farther than the epichlorohydrin only crosslinked sample of Comp. Ex. 4 while providing some, albeit lower, oxygen transmission resistance.

Examples 4 and 5 repeated conditions of Ex. 3 except that a coalescent dipropylene glycol methyl ether (DPM) and methanol were added respectively to the water of barrier coating precursor solution at 15 wt % of total solids. The examples demonstrate that good oxygen transmission resistance and transverse stretch was obtained despite these composition changes.

Comparative Examples 5-9

Comparative Example 5 was produced similarly to Ex. 2 except that acetic acid was substituted for citric acid while providing the same pH of 5 in barrier coating solution. The amount of PVOH/PVA in Comp. Ex. 5 was about 82.98 wt % of the dried coating; the amount of acetic acid was about 13.55 wt % of the dried coating. The barrier layer was able to stretch without cracking in the transverse direction; however oxygen transmission rate was very high, and generally unacceptable, at 14.5 cm³/100 in²/day (225 cm³/m²/day). Comparative Example 9 was produced similarly to Ex. 2 except that paratoluenesulfonic acid (PTSA) was substituted for the citric acid while providing similar pH of 5 in the barrier coating solution. PVOH/PVA content in the barrier layer of Comp. Ex. 9 was about 79.06 wt % of the dried coating; the PTSA was about 19.49 wt % of the dried coating. Oxygen barrier resistance was very poor with the PTSA-modified PVOH/PVA at 10.17 cm³/100 in²/day (157.6 cm³/m²/day). Thus, alternative acids such as acetic acid and PTSA appeared to be inferior in modifying PVOH/PVA gas barrier properties compared to citric acid.

Comparative Examples 6-8 were produced by an "off-line" procedure in which the biaxially oriented polymeric base layer film was produced as described above but the barrier coating was applied via manual hand draw-downs in a laboratory without transverse stretching during barrier layer formation. Single sheets of the substrate were hand-coated with the barrier coating using a meyer rod and the wet-coated sheets were then subsequently dried in a static oven. The composition of Comp. Ex. 6 was comparable to Comp. Ex. 4 and demonstrated that epichlorohydrin cross-linked non-citric acid-modified PVOH/PVA barrier film without transversely stretching the coated barrier layer (which cracked the barrier coating) provided only moderate oxygen transmission resistance that was still significantly worse than Examples 2 and 4. Comp. Exs. 7 and 8 were similar to Comp. Ex. 6 but included citric acid modification, showed that merely adding citric acid at different pH values to modify the crosslinked PVOH/PVA barrier layer without transverse stretching also did not significantly change the oxygen transmission performance compared to Examples 2 and 4, due to the inability for the coated substrate to be exposed to the proper degree of heat required to activate the crosslinking mechanism. Comparison of Comp. Ex. 8 to Ex. 2 revealed that citric acid modification with transverse stretching can reduce oxygen transmission resistance substantially to a range useful for high gas barrier demanding packaging applications.

While primarily directed to clear film, the novel mPVA polymer barrier layer can also be effective when applied on a non-transparent base layer such as opaque, translucent, dyed, or pigmented film. A contemplated example of non-transparent base layer is an opaque, white base layer in which the core layer comprises a dispersed cavitating agent. The cavitating agent forms a plurality of small voids within the core layer to render the base layer opaque with a white to off-white appearance. Cavitating agents may be organic or inorganic compounds. The cavitating agent can be activated during the uniaxial and/or biaxial orientation steps in the novel method of making the composite barrier film. Other suitable methods of making opaque or tinted color film employ adding to the core layer polymer prior to film formation effective amounts of pigments or dyes, such as titanium dioxide or barium sulfate, and carbon black for example. The composite film also can be made translucent and/or matte-finished by incorporating inorganic particles, matting agents, colorants or dyes. Any of the above described techniques can be combined and employed in the core and/or skin layer to produce composite barrier film having diverse appearance qualities of opacity, color and gloss as may be desired.

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

TABLE 2

|  | Comp. Ex. 1 | Comp. Ex. 2 | Ex. 1 | Comp. Ex. 3 | Comp. Ex. 4 | Ex. 2 | Ex. 3 |
| --- | --- | --- | --- | --- | --- | --- | --- |
| Base Layer |  |  |  |  |  |  |  |
| Polymer | PET-01 | PET-01 | PET-01 | PP-01 | PP-01 | PP-01 | PP-01 |
| Thickness |  |  |  |  |  |  |  |
| G | 48 | 48 | 48 | 80 | 80 | 80 | 80 |
| (μm) | (18) | (18) | (18) | (20) | (20) | (20) | (20) |
| Barrier Layer |  |  |  |  |  |  |  |
| Dried Thickness |  |  |  |  |  |  |  |
| #/ream | 0.20 | 0.20 | 0.20 | 0.12 | 0.12 | 0.12 | 0.12 |
| (g/m²) | (0.325) | (0.325) | (0.325) | (0.20) | (0.20) | (0.20) | (0.20) |
| PVOH[1] wt % | 58.6 |  |  | 58.6 |  |  |  |
| EVOH[2] wt % | 28.25 |  |  | 28.25 |  |  |  |

TABLE 2-continued

| | | | | | | | |
|---|---|---|---|---|---|---|---|
| PVOH/PVA³ wt % | | 98.20 | 84.63 | | 98.20 | 84.63 | 90.77 |
| Defoamer/surfactant⁴ wt % | 0.87 | 0.82 | 0.71 | 0.87 | 0.82 | 0.71 | 0.76 |
| Coalescent wt %⁵ | | | | | | | |
| Glyoxal⁶ wt % | 12.27 | | | 12.27 | | | |
| Epichlorohydrin⁷ wt % | | 0.98 | 0.85 | | 0.98 | 0.85 | 0.91 |
| Acetic acid wt % | | | | | | | |
| Citric acid wt % | | | 13.82 | | | 13.82 | 7.56 |
| PTSA⁸ wt % | | | | | | | |
| Composite Film | | | | | | | |
| TD stretch factor | 4.5 | 4.5 | 4.5 | 8 | 8 | 8 | 8 |
| OTR | | | | | | | |
| cm³/100 in²/day | 0.420 | 0.026 | 0.008 | 0.80 | failed | 0.040 | 1.213 |
| (cm³/m²/day) | (6.5) | (0.40) | (0.12) | (12.41) | failed | (0.62) | (18.8) |
| MVTR | | | | | | | |
| g/100 in²/day | 0.130 | 0.123 | 0.120 | 0.20 | failed | 0.070 | 0.070 |
| (g/m²/day) | (2.02) | (1.91) | (1.86) | (3.1) | failed | (1.1) | (1.01) |

| | Ex. 4 | Comp. Ex. 5 | Ex. 5 | Comp. Ex. 6 | Comp. Ex. 7 | Comp. Ex. 8 | Comp. Ex. 9 |
|---|---|---|---|---|---|---|---|
| Base Layer | | | | | | | |
| Polymer | PP-01 | PP-01 | PP-01 | PP-01 | PP-01 | PP-01 | PP-01 |
| Thickness | | | | | | | |
| G (µm) | 80 (20) | 80 (20) | 80 (20) | 80 (20) | 80 (20) | 80 (20) | 80 (20) |
| Barrier Layer | | | | | | | |
| Dried Thickness | | | | | | | |
| #/ream (g/m²) | 0.12 (0.20) | 0.12 (0.20) | 0.12 (0.20) | 0.12 (0.20) | 0.12 (0.20) | 0.12 (0.20) | 0.12 (0.20) |
| PVOH¹ wt % | | | | | | | |
| EVOH² wt % | | | | | | | |
| PVOH/PVA³ wt % | 82.98 | 82.98 | 84.63 | 98.20 | 87.56 | 84.63 | 79.06 |
| defoamer/surfactant⁴ wt % | 0.69 | 0.69 | 0.71 | 0.82 | 0.73 | 0.71 | 0.66 |
| coalescant⁵ wt % | 1.95 | 1.95 | | | | | |
| glyoxal⁶ wt % | | | | | | | |
| epichlorohydrin⁷ wt % | 0.83 | 0.83 | 0.85 | 0.98 | 0.88 | 0.85 | 0.79 |
| acetic acid wt % | | 13.55 | | | | | |
| citric acid wt % | 13.55 | | 13.82 | | 10.84 | 13.82 | |
| PTSA⁸ wt% | 19.49 | | | | | | |
| Composite Film | | | | | | | |
| TD stretch factor | 8 | 8 | | 0 | 0 | 0 | 8.5 |
| OTR | | | | | | | |
| cm³/100 in²/day | 0.060 | 14.46 | 0.200 | 0.150 | 0.170 | 0.200 | 10.17 |
| (cm³/m²/day) | (0.93) | (224) | (3.10) | (2.32) | (2.64) | (3.10) | (158) |
| MVTR | | | | | | | |
| g/100 in²/day | 0.080 | 0.07 | 0.080 | 0.080 | 0.080 | 0.080 | 0.08 |
| (g/m²/day) | (1.2) | (1.1) | (1.2) | (1.2) | (1.2) | (1.2) | (1.2) |

[1] Celvol 502 PVOH resin (Celanese International Corp.)
[2] Exceval 2117 EVOH resin (Kuraray America Inc.)
[3] Selvol™ Ultiloc™ 5003 BRS (Sekisui Specialty Chemicals of America, Dallas TX)
[4] Surfynol® 420 antifoam/leveling surfactant (Air Products and Chemicals, Inc.)
[5] DPM dipropylene glycol methyl ether (Dow Chemical Company)
[6] Freechem® 40 DL glyoxal (Emerald Performance Materials)
[7] Polycup® 9200 epichlorohydrin (Hercules, Inc.)
[8] Paratoluenesulfonic acid

What is claimed is:

1. A composite barrier film comprising (A) a base layer defining a base layer thickness, the base layer comprising a core layer comprising a polymer of polyester, and (B) a barrier layer coextensively adjacent in direct contact with one side of the base layer, the barrier layer defining a barrier layer thickness and comprising modified polyvinyl amine, in which the modified polyvinyl amine is a vinylamine polymer crosslinked by citric acid, in which the composite barrier film is optically clear, and in which the composite barrier film has moisture vapor transmission rate and oxygen transmission rate at most equal to that of a composite control film consisting essentially of a substrate identical to the base layer, and a layer of polyvinyl alcohol of thickness equal to the barrier layer thickness and disposed coextensively on the substrate.

2. The composite barrier film of claim 1 in which the vinylamine polymer is polyvinyl alcohol/polyvinyl amine copolymer.

3. The composite barrier film of claim 1 in which the base layer comprises an adhesive layer coextensive with the core layer and being on the one side of the base layer adjacent to the barrier layer.

4. The composite barrier film of claim 3 in which the adhesive layer comprises an amorphous copolyester, a primer coating or a polar polymer having polar functional groups substituted on, grafted onto or copolymerized into the polar polymer chain.

5. The composite barrier film of claim 1 in which the base layer comprises a skin layer comprising antiblocking additives dispersed in a polymer that is the same as that of the core layer, the skin layer being coextensive with the core layer and being on the one side of the base layer opposite to the barrier layer.

6. The composite barrier film of claim 1 that has been biaxially stretched by a process comprising the steps of
 (I) forming the base layer of polyester to have a length in a first technical direction and a width in a second technical direction transverse to the first technical direction,
 (II) stretching the web in the first technical direction by a stretch factor of about 1-3 times the length,
 (III) applying a coating of an aqueous solution of vinylamine polymer and citric acid onto a surface of the web,
 (IV) simultaneously (a) crosslinking the vinylamine polymer with the citric acid to form the barrier layer of modified polyvinyl amine and (b) stretching the web in the second technical direction by a stretch factor of about 3-5 times the width.

7. The composite barrier film of claim 1 of which the oxygen transmission rate is about 0.005-0.2 $cm^3/100\ in^2/day$ (about 0.08-3.1 $cm^3/m^2/day$) and the moisture vapor transmission rate is about 0.05-0.13 $g/100\ in^2/day$ (about 0.8-2 $g/m^2/day$).

8. The composite barrier film of claim 1 in which the modified vinyl amine polymer is polyvinyl alcohol/polyvinyl amine copolymer crosslinked by reaction with a combination of citric acid and at least one crosslinking agent other than citric acid.

9. A method of making a composite barrier film comprising the steps of
 (I) providing an aqueous solution comprising polyvinyl alcohol/polyvinyl amine copolymer and citric acid,
 (II) providing a base layer comprising a core layer of a polymer of polyester, the base layer defining a length in a first technical direction,
 (III) stretching the web in the first technical direction by a stretch factor of about 1-3 times the length,
 (IV) applying a coating of the aqueous solution onto a surface of the base layer, and
 (V) exposing the base layer coated with the aqueous solution to a temperature for a time effective to crosslink the polyvinyl alcohol/polyvinyl amine copolymer with the citric acid thereby forming a barrier layer of modified polyvinyl amine on the base layer.

10. The method of claim 9 in which the temperature of crosslinking is in the range of about 150° C.-185° C. and the time of crosslinking is about 5 seconds-60 seconds.

11. The method of claim 9 in which the aqueous solution has a pH in the range of about 5.5-8.5.

12. The method of claim 9 in which the aqueous solution comprises citric acid and at least one crosslinking agent other than citric acid.

13. The method of claim 9 in which steps (II)-(V) occur continuously, and in which the base layer is provided by melting and extruding the base layer polymer.

14. The method of claim 9 in which the polymer of the base layer is polyester and the base layer further defines a width in a second technical direction transverse to the first technical direction, and which method further comprises stretching the base layer in the second technical direction by a stretch factor of about 3-5 times the width, the stretching occurring contemporaneously with the heating and crosslinking step.

15. The method of claim 9 in which the aqueous solution is formed by a method comprising the steps of
 (IA) providing polyvinyl alcohol/polyvinyl amine copolymer particles and citric acid particles,
 (IB) adding the citric acid particles to water to form a mixture, the water being in amount effective to dissolve all of the citric acid particles,
 (IC) heating the mixture to a temperature in the range of about 85° C.-100° C. and agitating the mixture effectively to dissolve the citric acid particles,
 (ID) after dissolving substantially all of the citric acid particles, adding to the mixture an amount of polyvinyl alcohol/polyvinyl amine copolymer effective to provide amine functional groups in excess of the stoichiometric quantity of carboxylic acid functional groups present in the citric acid, and
 (IE) maintaining the temperature and agitation effectively to dissolve substantially all of the polyvinyl alcohol/polyvinyl amine copolymer, thereby forming the aqueous solution.

16. The method of claim 15 in which the aqueous solution has pH in the range of about 5.5 to about 8.5.

17. The method of claim 15 in which the mixture comprises a combination of citric acid and at least one crosslinking agent other than citric acid.

18. A package for containment of oxygen or moisture sensitive food comprising a composite barrier film comprising (A) a base layer comprising a base layer polymer of polyester, the base layer defining a base layer thickness, and (B) a barrier layer coextensive with the base layer, the barrier layer defined by a barrier layer thickness and comprising modified polyvinyl amine,
 in which the modified polyvinyl amine is vinylamine polymer crosslinked by reaction with citric acid,
 in which the barrier film is optically clear.

* * * * *